United States Patent [19]
Wege

[11] Patent Number: 4,794,510
[45] Date of Patent: Dec. 27, 1988

[54] RECTIFIER ASSEMBLY

[75] Inventor: Kevin K. Wege, Belvidere, Ill.

[73] Assignee: Sundstrand Corporation, Rockford, Ill.

[21] Appl. No.: 945,907

[22] Filed: Dec. 23, 1986

[51] Int. Cl.$^4$ .............................................. H02M 1/00
[52] U.S. Cl. .................... 363/145; 310/68 D
[58] Field of Search ............ 363/144, 145; 310/68 D

[56] References Cited
U.S. PATENT DOCUMENTS

| | | | |
|---|---|---|---|
| 3,629,631 | 12/1971 | Cotton et al. | 310/68 |
| 4,329,603 | 5/1982 | Ballard | 310/61 |
| 4,482,827 | 11/1984 | Baldwin | 310/68 |
| 4,543,504 | 9/1985 | Iwaki et al. | 363/145 X |
| 4,581,695 | 4/1986 | Hoppe | 363/145 |
| 4,603,344 | 7/1986 | Trommer | 310/68 D X |
| 4,606,000 | 8/1986 | Steele et al. | 363/145 |
| 4,628,219 | 12/1986 | Troscinski | 363/145 X |

FOREIGN PATENT DOCUMENTS 2819824 12/1978 Fed. Rep. of Germany ... 310/68 D

Primary Examiner—Patrick R. Salce
Assistant Examiner—Kristine Peckman
Attorney, Agent, or Firm—Wood, Dalton, Phillips Mason & Rowe

[57] ABSTRACT

A compact rectifier assembly for use in a synchronous electric machine having a rotor. A circumferential housing surrounds a plurality of discrete diodes mounted within the housing. The housing is fabricated of non-conductive material and adapted for incorporation in the rotor of the machine. The diodes are mounted on and electrically coupled to mounting plates fixed directly to the inside of the non-conductive housing, the mounting plates also acting as heat sinks. The housing includes a pair of interfitting non-conductive parts to facilitate assembling the diodes within the housing, and the housing is configured to define a sealed chamber about the diodes for the passage therethrough of a coolant.

2 Claims, 1 Drawing Sheet

RECTIFIER ASSEMBLY

FIELD OF THE INVENTION

This invention generally relates to rectifier assemblies and, particularly, to a full wave, three-phase rectifier assembly which may be used, for example, in a synchronous, rotary electric machine such as a brushless generator.

BACKGROUND OF THE INVENTION

Full wave, three-phase rectifiers are employed in a variety of environments. Depending upon the specific environment in which they are used, various requirements attend the construction of the rectifier.

One application in which such rectifiers is used is a so-called "brushless generator". In a typical brushless generator construction, three-phase windings forming part of an exciter are carried by the rotor. Rotor rotation results in the generation, in such windings, of a three-phase signal. Such signal then is rectified by a rectifier carried by the rotor to provide a source of direct current to the main field winding of the generator which also is carried by the rotor. Because the rectifier forms part of the rotor, it must be capable of withstanding the high centrifugal forces placed upon its components during generator operation. It also is highly desirable that the rectifier be as compact as possible, both axially and radially, so that the overall size of the rotor can be made as small as possible. An example of such an application is shown in U.S. Pat. No. 4,482,827 to Baldwin, dated Nov. 13, 1984 and assigned to the assignee of this invention. This patent shows six diodes each having a base forming one pole of the electrical circuit of the diode and a terminal forming the other pole of the electrical circuit. Such assemblies often are called discrete diode assemblies.

Another application of a compact full wave rectifier assembly for use in a brushless alternator is shown in U.S. Pat. No. 4,581,695 to Hoppe, dated Apr. 8, 1986 and assigned to the assignee of this invention. This patent shows silicon wafers (diodes) or chips which have a somewhat different physical mounting.

U.S. Pat. No. 4,329,603 to Ballard, dated May 11, 1982 and assigned to the assignee of this invention shows a further construction of a rectifier assembly for use on the rotor of a synchronous machine such as a brushless alternating current generator or a brushless synchronous motor. This patent shows an assembly which is mounted to a housing, insulated from a mounting base, capable of withstanding centrifugal force created at normal operating speeds and is efficiently cooled. The rectifier assembly can be connected to provide either half-wave or full-wave rectification.

The present invention is directed to further improvements in discrete diode assemblies of the character described above, such as for use in an electrical generator system utilizing an integrated diode rectifier, wherein the rotating discrete diode rectifier assembly is employed as a back-up. The invention includes such improvements as mounting the discrete diode in a non-conductive housing, the housing itself being mounted within the rotor of the synchronous rotary electric machine and providing for the passage therethrough of a coolant. The mounting plates for the diodes form part of the circuit, as heat sinks, to eliminate considerable wiring and its space requirements. The diodes are electrically coupled directly to their respective mounting plates. This is easily afforded by making the housing non-conductive.

SUMMARY OF THE INVENTION

An object, therefore, of the invention generally is to provide a discrete diode assembly and, specifically, a compact rectifier assembly for use in a synchronous rotary electric machine having a rotor.

In the exemplary embodiment of the invention, the compact rectifier assembly includes a plurality of discrete diodes and a circumferential housing for surrounding the diodes. The housing is fabricated of non-conductive material and adapted for incorporation in the rotor of the synchronous rotary electric machine.

Specifically, the housing is illustrated as including a pair of interfitting non-conductive parts to facilitate assembling the diodes within the housing. The non-conductive housing is configured to define a sealed chamber about the diodes for the passage therethrough of a coolant. Seal means is disposed between the interfitting parts to seal the chamber.

The diodes are mounted on and electrically coupled to mounting plates which form part of the electric circuit and also act as heat sinks. The mounting plates simply are fixed to the inside of the non-conductive housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
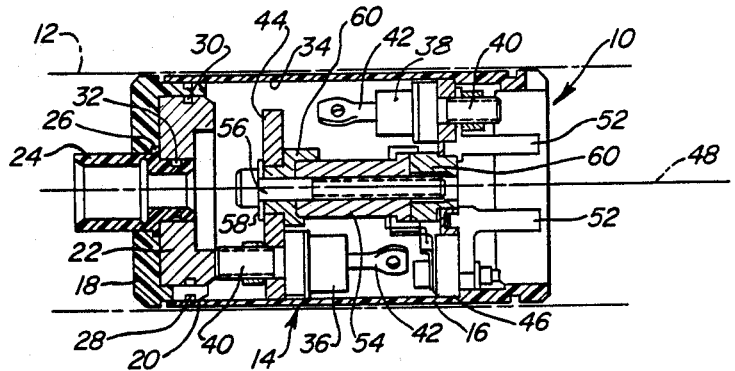
FIG. 1 is an axial section through the rectifier assembly of the invention.

Referring to the drawings in greater detail, and first to FIG. 1, a discrete diode rectifier assembly, generally designated 10, is mounted within or adapted for incorporation in a rotor 12 of a synchronous rotating electric machine. The rotor is shown somewhat schematically since it does not form part of the invention. Rectifier assembly 10 includes a cylindrical tubular housing, generally designated 14, which includes a main body part 16 and a mating end cap 18 which telescopingly interfit at an interface, as at 20. A terminal support 22 is press-fit within end cap part 18. An inlet member 24 extends through cap part 18 and is held in position by a peripheral flange 26 sandwiched between terminal support 22 and end cap 18. A first seal 28 is provided in the interfitting interface 20 between housing parts 16 and 18; a second seal 30 is provided between end cap 18 and terminal support 22; and a third seal 32 is provided between terminal support 22 and inlet member 24 to completely seal a cylindrical interior cavity 34 within housing 14.

The assembly includes two pair of three diodes 36 and 38, each diode having a base portion 40 and a terminal portion 42. The three diodes 36 are mounted in a plate assembly, including a mounting plate 44, and the other three diodes 38 are mounted in a plate assembly, including a mounting plate 46. The mounting plates are fabricated of aluminum. Each mounting plate 44,46 comprises a part of the electrical circuit of the rectifier and is fixed directly to the inside of the non-conductive housing, thereby eliminating considerable wiring. Each mounting plate also forms a heat sink. The bases of diodes 36 are electrically coupled directly to mounting plate 44, and the bases of diodes 38 are electrically coupled directly to mounting plate 46.

Each pair of three diodes 36,38 are arranged such that the three diodes in each pair of spaced angularly about axis 48 of the rectifier assembly equidistant from each other and in an equilateral triangular array. In this manner, as can be seen in FIG. 1, terminals 42 of diodes 36 and terminals 42 of diodes 38 project in opposite directions but overlie each other in a spaced relationship such that the rectifier assembly is made quite compact. Such arrays also can be seen in some of the aformentioned patents.

Figure 2:
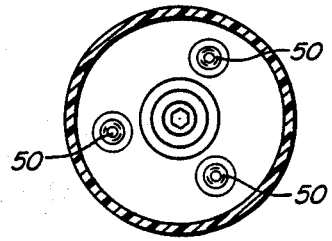
FIG. 2 is an end elevational view showing the terminals of three of the diodes.

As is somewhat conventional, as seen in FIG. 2, terminals 50 of a three-phase AC input are exposed on the outside of housing 14, namely end cap part 18. As seen in FIG. 1, two DC output terminals 52 project through housing part 16 at the opposite end of the housing.

A surge suppression resistor 54 is mounted in the assembly directly within housing 14. The resistor is shown as surrounding a steel screw 56 which forms a heat sink for the resistor and which is insulated by an insulating washer 58 and two resistor bushings 60 from diode mouting plates 44,46.

Figure 3:
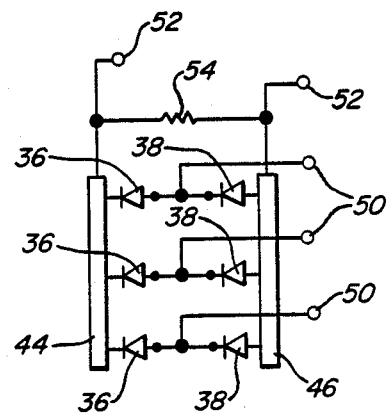
FIG. 3 is an electrical schematic diagram of the rectifier assembly, illustrating the six diodes, their respective mounting plates and the suppression resistor, all of which are mounted within the rectifier assembly housing.

The wiring for the rectifier assembly is omitted from FIG. 1 in order to facilitate the illustration of the above-described components. However, FIG. 3 schematically illustrates the full-wave, three-phase rectifier thus established. FIG. 3 utilizes the same reference numerals given in connection with the description of the physical components shown in FIGS. 1 and 2 for corresponding locations in the circuit.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A compact full wave, three phased rectifier assembly for incorporation in a rotor of a generator or the like, comprising:
    six diodes with two pair of three diodes being mounted on respective first and second mounting plates forming heat sinks, the mounting plates forming part of the electric circuit of the rectifier;
    a circumferential housing for surrounding the diodes, the housing being fabricated of non-conductive material and adapted for incorporation in said rotor, and the first and second mounting plates being fixed directly to the non-conductive housing; and
    a surge suppression resistor mounted within the housing surrounding a third heat sink, said third heat sink comprising fastening means between the first and second heat sinks.

2. The rectifier assembly of claim 1 wherein said first and second heat sinks are fabricated of aluminum and said third heat sink is fabricated of steel or the like.

* * * * *